(12) United States Patent
Yano et al.

(10) Patent No.: US 8,774,979 B2
(45) Date of Patent: Jul. 8, 2014

(54) EXECUTIVE MONITORING AND CONTROL SYSTEM FOR SMART GRID AND MICRO GRID

(75) Inventors: Ryo Yano, Fuchu (JP); Yoshihiro Ogita, Fuchu (JP); Akinori Nishi, Kunitachi (JP); Takenori Kobayashi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 11 days.

(21) Appl. No.: 13/405,605

(22) Filed: Feb. 27, 2012

(65) Prior Publication Data

US 2012/0158202 A1 Jun. 21, 2012

Related U.S. Application Data

(63) Continuation of application No. PCT/JP2009/070840, filed on Dec. 14, 2009.

(30) Foreign Application Priority Data

Sep. 8, 2009 (JP) .................................. 2009-207238

(51) Int. Cl.
*H02J 3/14* (2006.01)

(52) U.S. Cl.
USPC .......................................... 700/295; 700/297

(58) Field of Classification Search
None
See application file for complete search history.

(56) References Cited

U.S. PATENT DOCUMENTS

| | | | |
|---|---|---|---|
| 2010/0187907 A1 | 7/2010 | Toba et al. | |
| 2011/0029148 A1* | 2/2011 | Yang et al. | 700/297 |
| 2011/0137482 A1 | 6/2011 | Toba et al. | |

FOREIGN PATENT DOCUMENTS

| | | |
|---|---|---|
| JP | 03-034292 | 2/1991 |
| JP | 11-313441 | 11/1999 |
| JP | 2000-078748 | 3/2000 |
| JP | 2005-117787 | 4/2005 |
| JP | 2006-060885 | 3/2006 |
| JP | 2006-094611 | 4/2006 |
| JP | 2006-246683 | 9/2006 |
| JP | 2007-028769 | 2/2007 |
| JP | 2007-323942 | 12/2007 |
| JP | 2008-42961 | 2/2008 |
| JP | 2008-61382 | 3/2008 |
| JP | 2008-118799 A | 5/2008 |
| JP | 2008-136677 | 6/2008 |
| JP | 2008-201016 | 9/2008 |
| JP | 2008-271723 | 11/2008 |
| JP | 2008-301641 | 12/2008 |
| JP | 2009-148098 | 7/2009 |
| WO | WO 2009/076410 A1 | 6/2009 |

OTHER PUBLICATIONS

Machine Translation of JP 2009-148098.*

(Continued)

*Primary Examiner* — Ryan Jarrett
(74) *Attorney, Agent, or Firm* — Oblon, Spivak, McClelland, Maier & Neustadt, L.L.P.

(57) ABSTRACT

According to one embodiment, there is provided an executive monitoring and control system for monitoring and controlling a power generation output of each dispersed power source and a load of each demand facility in a smart grid or a micro grid. An abnormal-time interchange procedure formation unit forms, when a fault occurs in a system, an interchange procedure of matching the total power generation output amount of dispersed power sources with the total loading of demand facilities, by using at least the information acquired by the measurement value monitoring unit and the information managed by the customer information management unit.

5 Claims, 13 Drawing Sheets

(56) References Cited

OTHER PUBLICATIONS

Machine Translation of JP 2008-61382.*
Machine Translation of JP 2008-301641.*
International Preliminary Report on Patentability and Written Opinion issued Apr. 19, 2012 in Application No. PCT/JP2009/070840.
International Search Report issued on Mar. 2, 2010 for PCT/JP2009/070840 filed on Dec. 14, 2009.
International Written Opinion issued on Mar. 2, 2010 for PCT/JP2009/070840 filed on Dec. 14, 2009.
Office Action issued Jul. 23, 2013 in Japanese Patent Application No. 2009-207238 (with English-language translation).
Office Action mailed Oct. 12, 2013 in Chinese Patent Application No. 200980160439.8 (with English-language Translation).
Office Action mailed Feb. 4, 2014 in Japanese Patent Application No. 2009207238 (with English Translation).

* cited by examiner

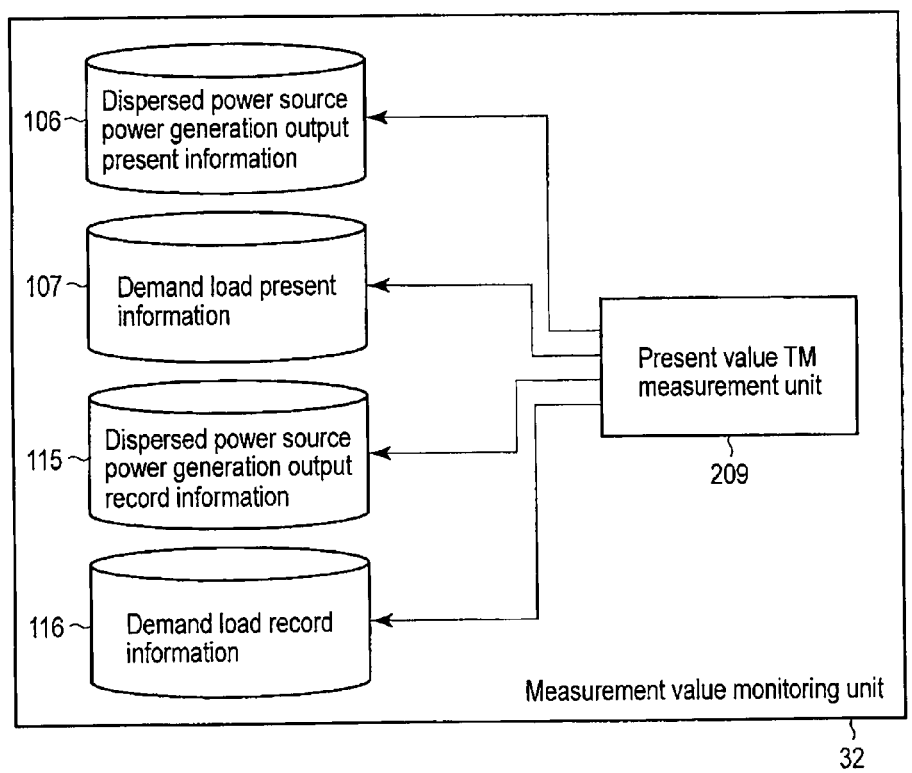
F I G. 3

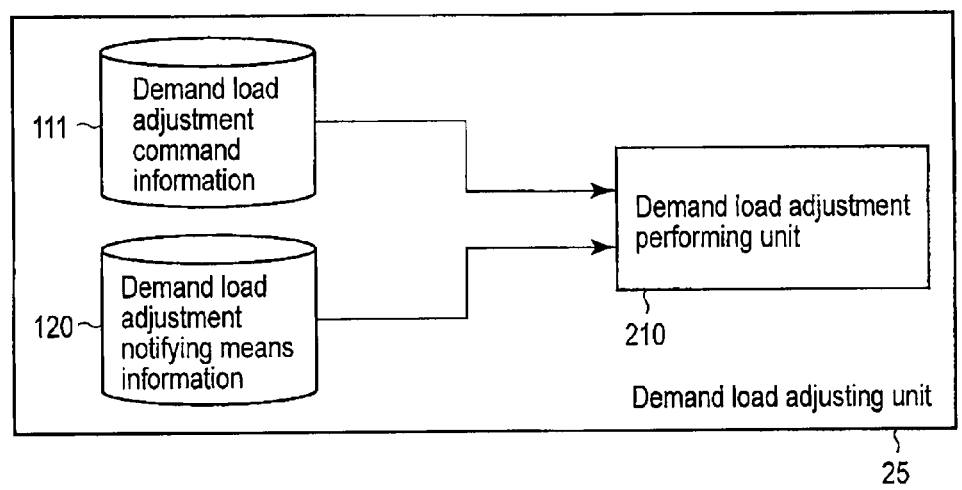
F I G. 5

EXECUTIVE MONITORING AND CONTROL SYSTEM FOR SMART GRID AND MICRO GRID

CROSS-REFERENCE TO RELATED APPLICATIONS

This application is a Continuation Application of PCT Application No. PCT/JP2009/070840, filed Dec. 14, 2009 and based upon and claiming the benefit of priority from prior Japanese Patent Application No. 2009-207238, filed Sep. 8, 2009, the entire contents of all of which are incorporated herein by reference.

FIELD

Embodiments described herein relate generally to an executive monitoring and control system for a smart grid and micro grid.

BACKGROUND

Electric power daily used by users is generated by various power stations (e.g., nuclear, thermal, and hydroelectric power stations), and high-quality electric power is stably supplied to consumers through trunk transmission power systems and distribution systems. However, the existing power systems use large-scale centralized power plants in order to stably supply large amounts of electricity. This prolongs the lead time from planning to the start of operation. Also, areas meeting the conditions of locations for large-scale power plants are often far from demand areas. This limits increases in the total energy efficiency, which includes the heat collection rate.

Also, as concern for environmental protection increases and relevant laws are enforced in recent years, a demand for environmental load reduction such as $CO_2$ reduction is increasing. To meet this demand, the development and implementation of renewable energies such as fuel cells, biomass power generation, solar power generation, wind power generation, and thermal storage devices are rapidly advancing. On the other hand, outputs from dispersed power sources using natural energy such as sunlight and wind are unstable and difficult to control. Therefore, when many dispersed power sources using natural energy are connected to the existing large-scale power networks (to be referred to as "commercial networks" hereinafter) in the future, these power sources may adversely affect qualities such as the stability and reliability of the system.

As a means for solving these problems, smart grids and micro grids are recently attracting much attention throughout the world. For example, a micro grid can achieve a high total energy efficiency by placing a power source in a demand area. It is also possible to construct a network that does not influence the commercial network while taking account of the environment, by using a power source configuration combining a power source such as a naturally varying power source that is difficult to control and a controllable power source. A "micro grid" is termed a "good citizen" as it comprises small-scale networks and systems of dispersed power sources by mutually compensating for the features of these dispersed power sources, thereby minimizing the influence on power systems and contributing to the power systems.

Much research and demonstration of micro grids has taken place in Japan as well. In a project from 2003 to 2007, empirical research undertaken at the behest of the NED was carried out in, e.g., Aichi, Kyoto, and Hachinohe. It is anticipated that micro grids will contribute in dealing with issues such as peaks in power demand and load leveling, in addition to environmental problems. The contents of many reports concerning micro grids relate to evaluations pertaining to the balancing of the connection point flow which takes into account smooth operation in normal operation, or demand/supply control functions of balancing the demand and supply by using, e.g., dispersed power sources and power storage devices.

To actually operate a micro grid, it is necessary to perform monitoring and control to maintain the same power quality level as that of a commercial network. For example, it is necessary to perform all of demand/supply planning and frequency control performed by the EMS (Energy Management System), charge/blackout monitoring, system operation, fault restoration, and voltage control performed by the DAS (Distribution Automatic System), facility management, construction planning, and building work assistance performed by the DMS (Distribution Management System), and load control performed by the DSM (Demand Side Management).

The power source capacity of the existing commercial network (distribution system level) guarantees a power amount with which one power source terminal can supply electric power to the whole distribution line, except for, e.g., a demand peak time in summer. Even when system switching is performed because a fault has occurred or a work has to be performed, another power source can easily be secured, and the frequency at which a supply hindrance section occurs is very low. In the micro grid, however, the energy source is an aggregate of small dispersed power sources. Accordingly, even when the supply power amount is sufficient in normal operation, it is highly likely that sections in which the supply power amount becomes insufficient are produced in some places if system switching is performed. Therefore, many supply hindrance sections may be created in a micro grid even if the conventional power interchange method, which is based on the assumption that the power source capacity is sufficiently ensured, is utilized in the micro grid.

In an abnormal occasion such as when a fault has occurred, for example, the power generation outputs of dispersed power sources connected in the micro grid must be varied in order to secure the reserve capacity as an emergency measure. Even when the power generation outputs of the dispersed power sources are adjusted, however, it is sometimes impossible to ensure a sufficient supply power source amount because the power generation capacity is low, or there is a dispersed power source such as solar power generation or wind power generation whose power generation output is uncontrollable.

Also, when planning a work, a work performing system must be made by planning the adjustment of the power generation outputs of dispersed power sources and the demand loads. When performing the work, the same operation state as that in normal operation must be maintained. However, the micro grid includes a naturally varying power source (e.g., wind power generation or solar power generation) that varies the power generation output amount in accordance with, e.g., the weather of the day. Accordingly, a system state assumed when planning the work and that when performing the work are often different.

This problem arises not only in the micro grid but also in the smart grid.

In the above circumstances, it is desired to provide an executive monitoring and control system capable of appropriately interchanging electric power when a fault has occurred or when a work has to be performed in the smart grid or micro grid.

BRIEF DESCRIPTION OF THE DRAWINGS

FIG. 3 is a view showing a configuration example of a measurement value monitoring unit 32;

FIG. 5 is a view showing a configuration example of a demand load adjusting unit 25;

DETAILED DESCRIPTION

Embodiments will be described below with reference to the drawings.

In general, according to one embodiment, there is provided an executive monitoring and control system for monitoring and controlling a power generation output of each dispersed power source and a load of each demand facility in a smart grid or a micro grid. The executive monitoring and control system includes: measurement value monitoring means for acquiring information indicating a present power generation output amount of each dispersed power source and information indicating a present loading of each demand facility; customer information managing means for managing at least information indicating a rated power generation capacity and power generation output adjustable amount of each dispersed power source, information indicating a contract power amount and load adjustable amount of each demand facility, information which indicates a priority of each dispersed power source and is used to determine a dispersed power source as a target of power generation output amount adjustment, and information which indicates a priority of each demand facility and is used to determine a demand facility as a target of loading adjustment; and abnormal-time interchange procedure forming means for, when a fault occurs in a system of the micro grid or the smart grid, forming an interchange procedure of matching total power generation output amounts of dispersed power sources with a total loading of demand facilities, by using at least the information acquired by the measurement value monitoring means and the information managed by the customer information managing means.

Figure 1:
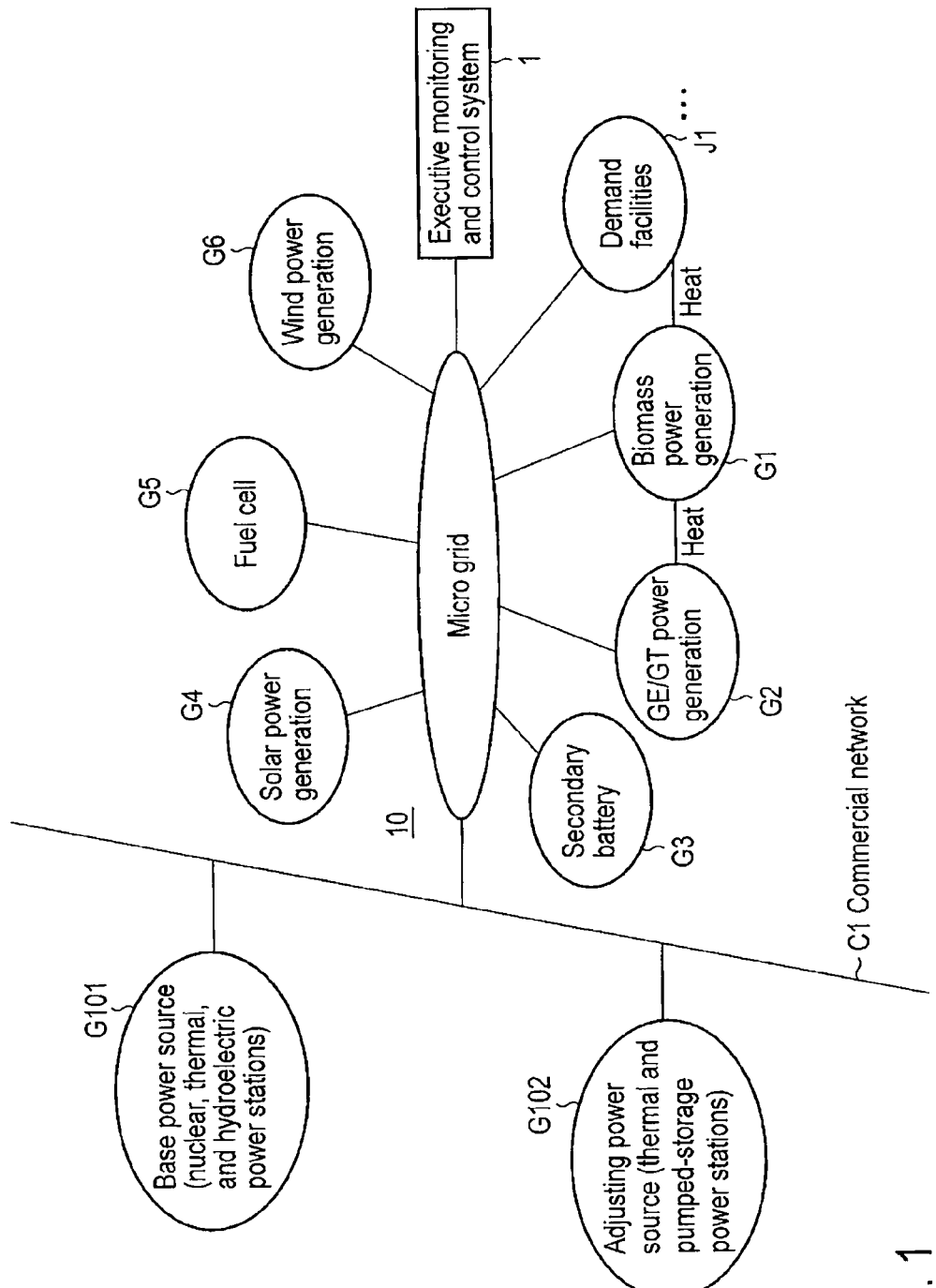
FIG. 1 is a view showing a configuration example of a whole system including a commercial network and a micro grid to which an executive monitoring and control system according to an embodiment of the present invention is applied.

FIG. 1 is a view showing a configuration example of a whole system including a commercial network and a micro grid to which an executive monitoring and control system according to an embodiment of the present invention is applied. Note that the micro grid shown in FIG. 1 can also be replaced with a smart grid.

As shown in FIG. 1, a micro grid 10 is a system that is connected by one connection point to a commercial network C1 including a base power source G101 and adjusting power source G102, includes a plurality of dispersed power sources (including a storage battery) G1 to G6 and demand facilities (loads) J1 ... of a plurality of consumers, and can be operated in association with and independently of the commercial network C1.

Examples of the dispersed power sources (including a storage battery) are a biomass generator G1, gas engine/gas turbine (GE/GT) generator G2, secondary battery G3, solar generator G4, fuel cell G5, and wind force generator G6.

An executive monitoring and control system 1 is a computer including various programs applicable to not only a micro grid but also a smart grid. For example, the executive monitoring and control system 1 is implemented as a computer for monitoring and controlling the power generation outputs of the individual dispersed power sources G1 to G6 and the loads of the individual demand facilities J1 ... in the micro grid 10.

Figure 2:
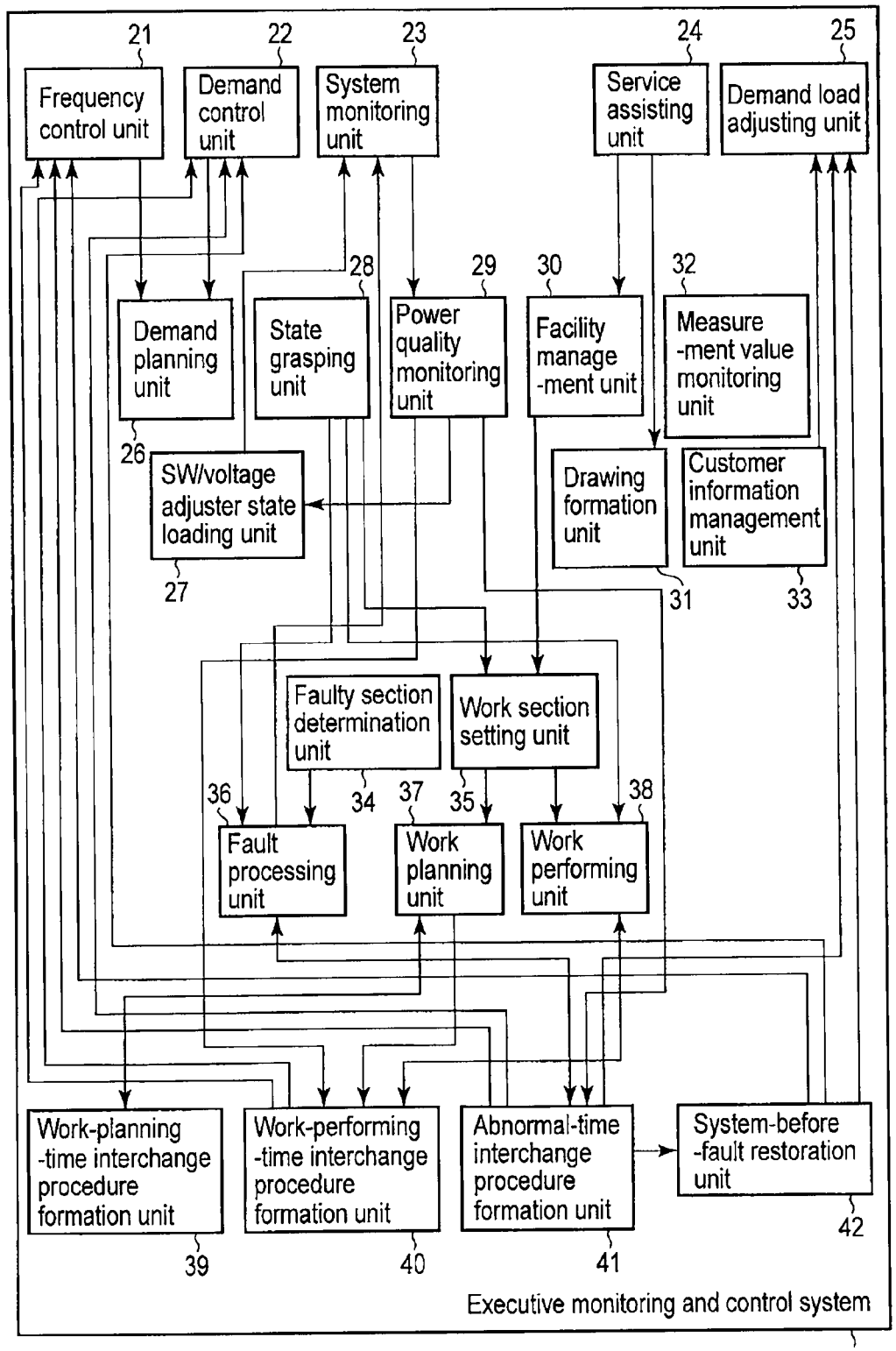
FIG. 2 is a view showing a configuration example of the executive monitoring and control system shown in FIG. 1.

FIG. 2 is a view showing a configuration example of the executive monitoring and control system shown in FIG. 1.

The executive monitoring and control system 1 shown in FIG. 2 includes, as various functions, a frequency control unit 21, demand/supply control unit 22, system monitoring unit 23, service assisting unit 24, demand load adjusting unit 25, demand/supply planning unit 26, SW/voltage adjuster state loading unit 27, state grasping unit 28, power quality monitoring unit 29, facility management unit 30, drawing formation unit 31, measurement value monitoring unit 32, customer information management unit 33, faulty section determination unit 34, work section setting unit 35, fault processing unit 36, work planning unit 37, work performing unit 38, work-planning-time interchange procedure formation unit 39, work-performing-time interchange procedure formation unit 40, abnormal-time interchange procedure formation unit 41, and system-before-fault restoration unit 42.

The frequency control unit 21 controls the frequency of the power generation output of each dispersed power source.

The demand/supply control unit 22 controls demand and supply between each dispersed power source and each demand facility.

The system monitoring unit 23 monitors a system to which each dispersed power source and each demand facility are connected.

The service assisting unit 24 assists services such as construction planning and building.

The demand load adjusting unit 25 adjusts the loading of a demand facility in accordance with an interchange procedure formed by the abnormal-time interchange procedure formation unit 41, or an interchange procedure formed by the system-before-fault restoration unit 42.

The demand/supply planning unit 26 plans demand and supply between each dispersed power source and each demand facility.

The SW/voltage adjuster state loading unit 27 loads signals indicating the states of a switch and voltage adjuster.

The state grasping unit 28 grasps, e.g., the presence/absence of a fault in the system.

The power quality monitoring unit 29 monitors the power quality of the system.

The facility management unit 30 manages the facilities of the system.

The drawing formation unit 31 forms drawings of the system.

The measurement value monitoring unit 32 acquires information indicating the present power generation output amount of each dispersed power source and information indicating the present loading of each demand facility, and saves information indicating the record of the past power generation output amount of each dispersed power source and information indicating the record of the past loading of each demand facility. For example, load surveys can be performed by using a measurement device such as a smart meter.

The customer information management unit 33 manages contract details concerning the dispersed power sources and demand facilities of customers. For example, the customer information management unit 33 manages information indicating the rated power generation capacity and power generation output adjustable amount of each dispersed power source, information indicating the contract power amount and load adjustable amount of each demand facility, information that indicates the priority of each dispersed power source and is used to determine a dispersed power source as a target of power generation output amount adjustment, and information that indicates the priority of each demand facility and is used to determine a demand facility as a target of loading adjustment.

The faulty section determination unit 34 determines a section in which a fault has occurred in the system.

The work section setting unit 35 sets a work section in the system.

The fault processing unit 36 processes a fault having occurred in the system.

The work planning unit 37 plans a work in the system.

The work performing unit 38 performs a planned work.

The work-planning-time interchange procedure formation unit 39 forms, when planning a work, an interchange procedure of the system of the micro grid 10, which is assumed as an interchange procedure for performing the work, by using at least the information saved by the measurement value monitoring unit 32 and the information managed by the customer information management unit 33, and information indicating an environmental influence degree corresponding to the power generation output amount of each dispersed power source or information indicating a cost corresponding to the power generation output amount of each dispersed power source.

The work-performing-time interchange procedure formation unit 40 recognizes, when performing a work, the difference between a system state when performing the work and a system state assumed, when planning the work, as a system state for performing the work, and forms an interchange procedure of matching the total power generation output amount of the dispersed power sources with the total loading of the demand facilities, by using at least the information acquired by the above-mentioned measurement value monitoring means and the information formed by the above-mentioned work-planning-time interchange procedure forming means when planning the work.

The abnormal-time interchange procedure formation unit 41 forms, when a fault occurs in the system of the micro grid 10, an interchange procedure of matching the total power generation output amount of the dispersed power sources with the total loading of the demand facilities as the first priority, by using at least the information acquired by the measurement value monitoring unit 32 and the information managed by the customer information management unit 33.

The system-before-fault restoration unit 42 restores, after a fault has occurred, the system to the state before the fault by using the information generated by the abnormal-time interchange procedure formation unit 41.

Next, the functional configurations of main elements included in the executive monitoring and control system 1 shown in FIG. 2 will be explained below with reference to FIGS. 3 to 9.

Referring to FIGS. 3 to 9, various kinds of information to be stored in storage media (not shown) exist. Before the explanation of the functional configurations shown in FIGS. 3 to 9, the various kinds of information will be explained. Note that the same reference numeral denotes the same information.

Interchange target section information 100 is information indicating a target section of power interchange (including system switching).

System-after-interchange information 101 is information indicating the configuration of the system after power interchange, e.g., the necessary electric power in the section after system switching.

Supply hindrance section information 102 is information indicating a section in which a supply hindrance (blackout) occurs owing to a fault.

Intra-system dispersed power source information 103 is information indicating the rated capacities of dispersed power sources connected in the system.

Contract demand power amount information 104 is information indicating the contract power amounts of customers connected in the system.

Faulty section restoration information 105 is information indicating, e.g., the time required for restoration of a faulty section.

Dispersed power source power generation output present information 106 is information indicating the present power generation output amounts of dispersed power sources connected in the system.

Demand load present information 107 is information indicating the present demand loadings of customers connected in the system.

Dispersed power source power generation output adjustment priority information 108 is information as a basis for determining a target of adjustment when performing dispersed power source power generation output adjustment. This information is formed by referring to, e.g., a financial incentive (reward). For example, if it will cost 100,000 yen for dispersed power source A and 200,000 yen for dispersed power source B when adjusting the same power generation output amount, the power generation output amount of dispersed power source A is adjusted.

Demand load adjustment priority information 109 is information as a basis for determining a target of adjustment when performing demand load adjustment, like the dispersed power source power generation output adjustment priority information 108.

Dispersed power source power generation output command information 110 is command information indicating the degree of adjustment of the power generation output amount of a dispersed power source. Based on this information, the frequency control unit 21 and demand/supply control unit 22 actually control and adjust a dispersed power source.

Demand load adjustment command information 111 is command information indicating the degree of adjustment of the loading of a demand facility. Based on this information, the demand load adjusting unit 25 actually adjusts the loading of a demand facility.

Facility information 112 is information of various facilities connected in the system.

Switch state information 113 is information indicating the ON/OFF states of switches connected in the system.

Work plan information 114 is information indicating a system configuration assumed, when planning a work, as a system configuration for performing the work. This information contains assumed dispersed power source power generation output amounts and demand loadings.

Dispersed power source power generation output record information 115 is information indicating the records such as the past power generation output amount tendencies of dispersed power sources connected in the system.

Demand load record information 116 is information indicating the records such as the past demand loading tendencies of customers connected in the system.

Environmentality calculation information 117 is information concerning the environmentality, e.g., how much $CO_2$ is produced when a certain amount of electric power is generated by a certain kind of dispersed power source.

Economy calculation information 118 is information concerning the economy, e.g., how much cost is required when a certain amount of electric power is generated by a certain kind of dispersed power source.

System-before-work information 119 is information indicating a healthy system configuration before work is performed.

Demand load adjustment notifying means information 120 is information indicating a communication method of requesting a customer to perform load adjustment exceeding the load adjustable limit of the consumer. Examples are making a phone call, sending a mail, and ringing a bell.

Financial incentive calculation information 121 is information indicating a financial incentive determined by, e.g., the type of contract with a customer. For example, this information indicates that a customer who normally pays a comparatively high contract fee will get a bigger financial incentive than other customers if the customer cooperates with demand load adjustment in cases of emergency.

System-after-fault information 122 is information indicating a system configuration after a fault.

System-before-fault information 123 is information indicating a healthy system configuration before a fault occurs.

CB ON/OFF state information 124 is information indicating the ON/OFF states of circuit breakers connected in the system.

FIG. 3 is a view showing a configuration example of the measurement value monitoring unit 32.

The measurement value monitoring unit 32 includes a present value TM measurement unit 209 as a main function.

The present value TM measurement unit 209 acquires the dispersed power source power generation amount present information 106 (information indicating the present power generation output amount of each dispersed power source) and the demand load present information 107 (information indicating the present loading of each demand facility), and stores these pieces of information in a storage medium. In addition, the present value TM measurement unit 209 forms the dispersed power source power generation output record information 115 (information indicating the record such as the tendency of the dispersed power source power generation output present information 106 acquired so far) and the demand load record information 116 (information indicating the record such as the tendency of the demand load present information 107 acquired so far), and stores the formed information in the storage medium.

Figure 4:
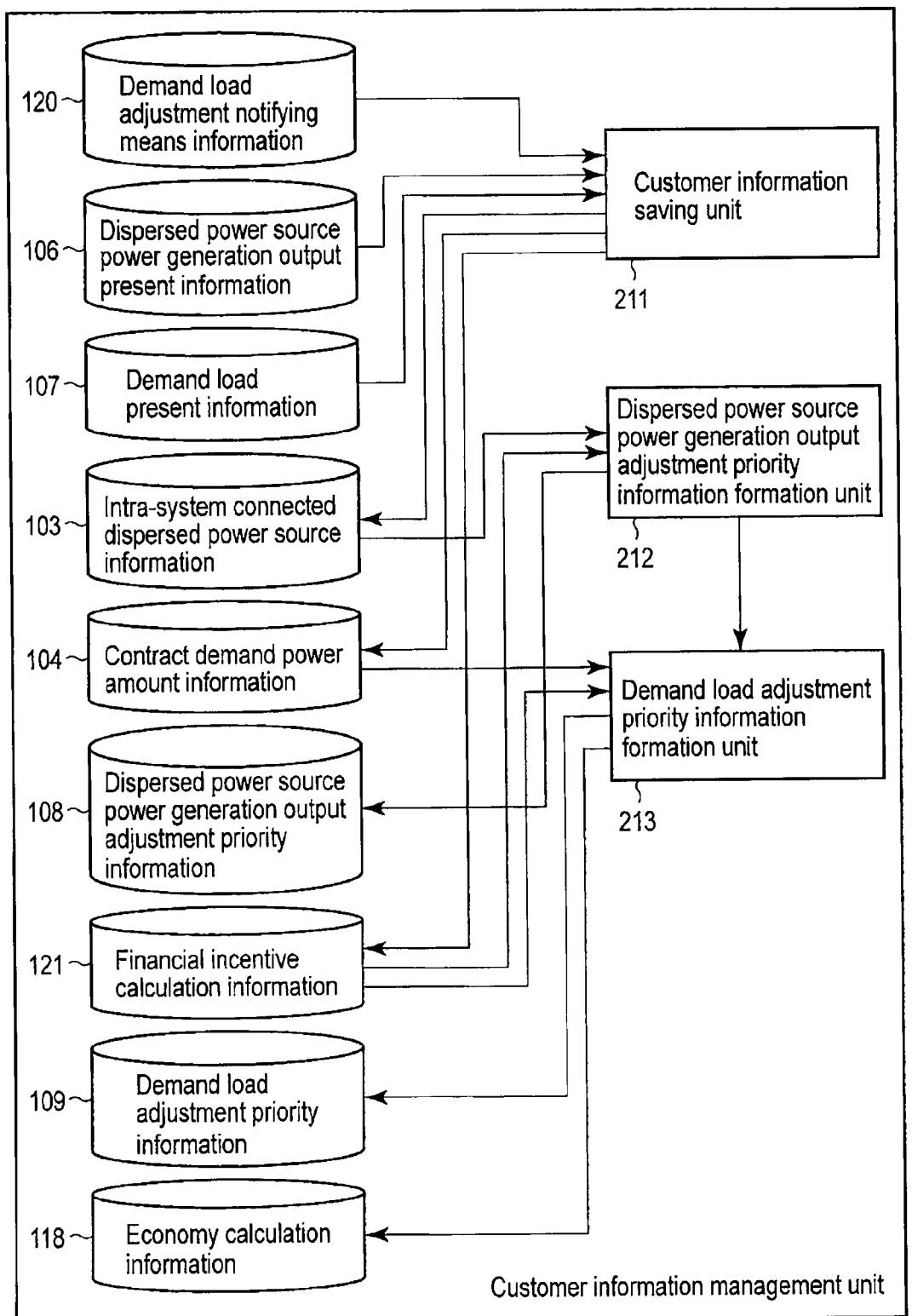
FIG. 4 is a view showing an example of a customer information management unit 33.

FIG. 4 is a view showing a configuration example of the customer information management unit 33.

The customer information management unit 33 includes a customer information saving unit 211, a dispersed power source power generation amount adjustment priority information formation unit 212, and demand load adjustment priority information formation unit 213, as main functions.

The customer information saving unit 211 forms the financial incentive calculation information 121 (information indicating a financial incentive to be paid to a customer when adjusting the power generation output amount of each dispersed power source or the loading of each demand facility), in addition to the intra-system dispersed power source information 103 (information indicating, e.g., the rated power generation capacity, the advisability of power generation output adjustment, and the power generation output adjustable amount of each dispersed power source), and the contract demand power amount information 104 (information indicating the contract power amount, the advisability of load adjustment, and the load adjustable amount of each demand facility), by using the preacquired demand load adjustment notifying means information 120, and the dispersed power source power generation output present information 106 and demand load present information 107 provided by the measurement value monitoring unit 32, and saves the formed information in a storage medium. The formed intra-system dispersed power source information 103 and contract demand power amount information 104 are provided to the abnormal-time interchange procedure formation unit 41 as needed.

The dispersed power source power generation output adjustment priority information formation unit 212 forms the dispersed power source power generation output adjustment priority information 108 (information indicating the priority of each dispersed power source, which is used to determine a dispersed power source as a target of power generation output amount adjustment), by using the intra-system dispersed power source information 103 and financial incentive calculation information 121 saved by the customer information saving unit 211, and saves the formed information in a storage medium. The formed dispersed power source power generation output adjustment priority information 108 is provided to the abnormal-time interchange procedure formation unit 41 and work-performing-time interchange procedure formation unit 40 as needed.

The demand load adjustment priority information formation unit 213 forms the demand load adjustment priority information 109 (information indicating the priority of each demand facility, which is used to determine a demand facility as a target of loading adjustment), by using the contract demand power amount information 104 and financial incentive calculation information 121 saved by the customer information saving unit 211, and saves the formed information in a storage medium. The formed demand load adjustment priority information 109 is provided to the abnormal-time interchange procedure formation unit 41 and work-performing-time interchange procedure formation unit 40 as needed. The demand load adjustment priority information formation unit 213 also has a function of forming the economy calculation information 118 (information indicating, e.g., a cost corresponding to the power generation output amount of each dispersed power source), and saving the formed information in the storage medium. The formed economy calculation information 118 is provided to the work-planning-time interchange procedure formation unit 39 and work-performing-time interchange procedure formation unit 40 as needed.

FIG. 5 is a view showing a configuration example of the demand load adjusting unit 25.

The demand load adjusting unit 25 includes a demand load adjustment performing unit 210 as a main function.

The demand load adjustment performing unit 210 adjusts the loading of a demand facility indicated by the demand load adjustment command information 111 provided by the system-before-fault restoration unit 42 or work-performing-time interchange procedure formation unit 40, by using the above-mentioned command information, and the demand load adjustment notifying means information 120 provided by the customer information saving unit 211 or the like.

Figure 6:
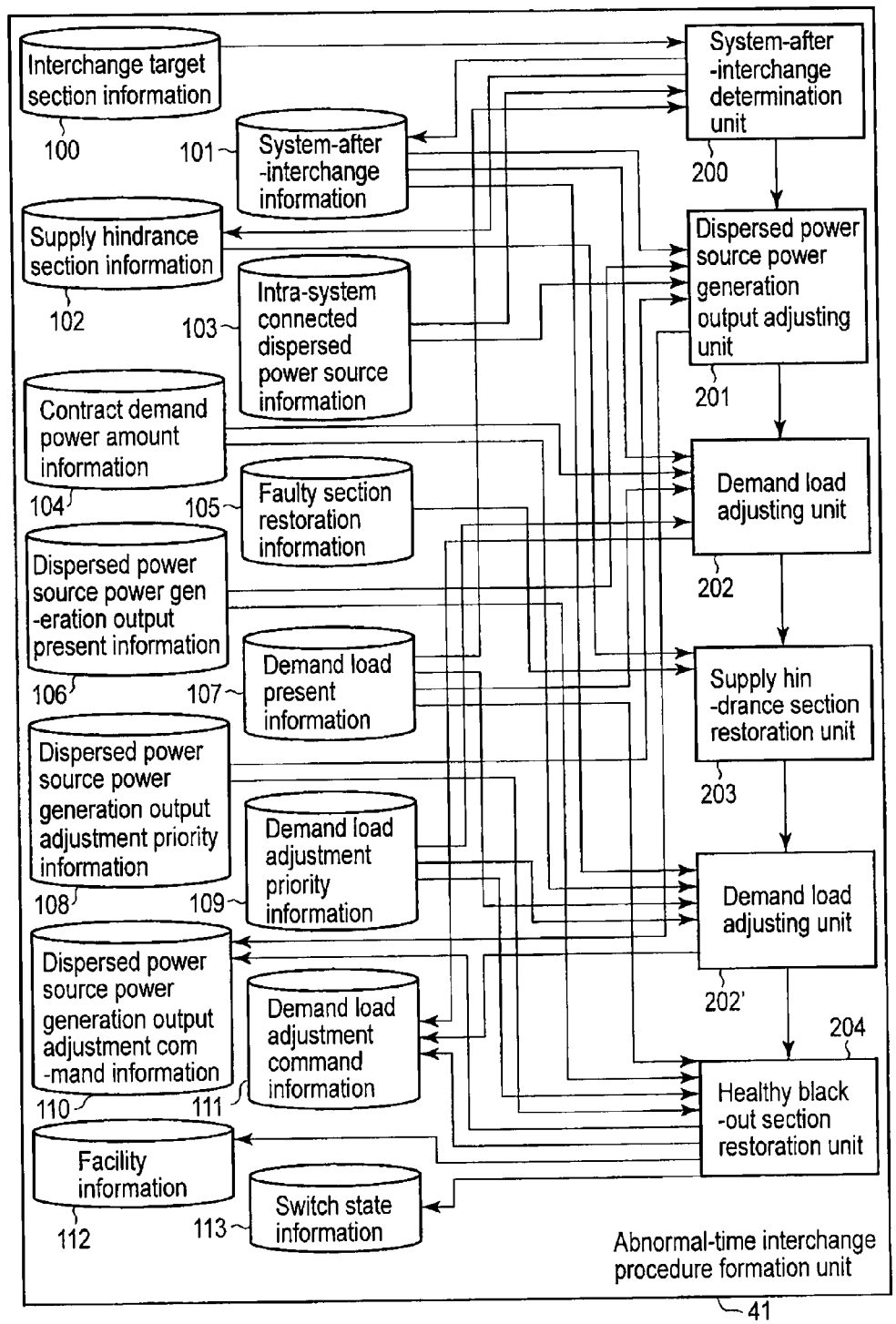
FIG. 6 is a view showing a configuration example of an abnormal-time interchange procedure formation unit 41.

FIG. 6 is a view showing a configuration example of the abnormal-time interchange procedure formation unit 41.

The abnormal-time interchange procedure formation unit 41 includes, as main functions, a system-after-interchange determination unit 200, dispersed power source power generation output adjustment amount determination unit 201, demand load adjustment amount determination unit 202, supply hindrance section restoration unit 203, and healthy blackout section restoration unit 204.

The system-after-interchange determination unit 200 forms the system-after-interchange information 101 by determining a system after power interchange, and also determining a power amount required to restore a healthy blackout section on that occasion, by using the interchange target section information 100 provided by the system monitoring unit 23 or the like, and saves the formed information in a storage medium.

The dispersed power source power generation output adjustment amount determination unit 201 forms the dispersed power source power generation output command information 110 containing an interchange procedure of adjusting the power generation output amount of a given dispersed power source, by using the system-after-interchange information 101 determined by the system-after-interchange determination unit 200, the dispersed power source power generation output present information 106 provided by the measurement value monitoring unit 32, and the intra-system dispersed power source information 103 and dispersed power source power generation output adjustment priority information 108 provided by the customer information management unit 33, and saves the formed information in a storage medium.

The demand load adjustment amount determination unit 202 forms the demand load adjustment command information 111 containing an interchange procedure of adjusting the loading of a given demand facility, if the supply power amount is insufficient when performing only power generation output adjustment by the dispersed power source power generation output adjusting unit 201, by using the system-after-interchange information 101 determined by the system-after-interchange determination unit 200, the demand load present information 107 provided by the measurement value monitoring unit 32, and the contract demand power amount information 104 and demand load adjustment priority information 109 provided by the customer information management unit 33, and saves the formed information in a storage medium.

The supply hindrance section restoration unit 203 forms an interchange procedure of requesting a consumer to permit further loading adjustment of a demand facility (load adjustment exceeding the load adjustable amount of the consumer), if the supply power amount is insufficient even when performing load adjustment by the demand load adjusting unit 202, and if restoration from a fault takes a predetermined time or more, by using the faulty section restoration information 105 provided by the fault processing unit 36, and the dispersed power source power generation output present information 106 provided by the measurement value monitoring unit 32, and instructs a demand load adjustment amount determination unit 202' to form an interchange procedure for further load adjustment.

The demand load adjustment amount determination unit 202' forms the demand load adjustment command information 111 containing an interchange procedure of further adjusting the loading of a given demand facility, in response to the instruction from the supply hindrance section restoration unit 203, by using the system-after-interchange information 101 determined by the system-after-interchange determination unit 200, the demand load present information 107 provided by the measurement value monitoring unit 32, and the contract demand power amount information 104 and demand load adjustment priority information 109 provided by the customer information management unit 33, and saves the formed information in a storage medium. Note that the demand load adjustment amount determination unit 202' may also be integrated with the demand load adjustment amount determination unit 202.

The healthy blackout section restoration unit 204 forms the dispersed power source power generation output command information 110 and demand load adjustment command information 111 containing an interchange procedure of performing restoration considering the reverse power flow of a dispersed power source of a demand facility for performing an interchange process for a healthy blackout section, and also forms the facility information 112 and switch state information 113 relevant to the above-mentioned information, by using the dispersed power source power generation output present information 106 and demand load present information 107 provided by the measurement value monitoring unit 32, and the dispersed power source power generation output adjustment priority information 108 and demand load adjustment priority information 109 provided by the customer information management unit 33, and saves the formed information in a storage medium. The formed dispersed power source power generation output command information 110, demand load adjustment command information 111, facility information 112, and switch state information 113 are provided to the frequency control unit 21, demand/supply control unit 22, demand load adjusting unit 25, or system-before-fault restoration unit 42 as needed.

Figure 7:
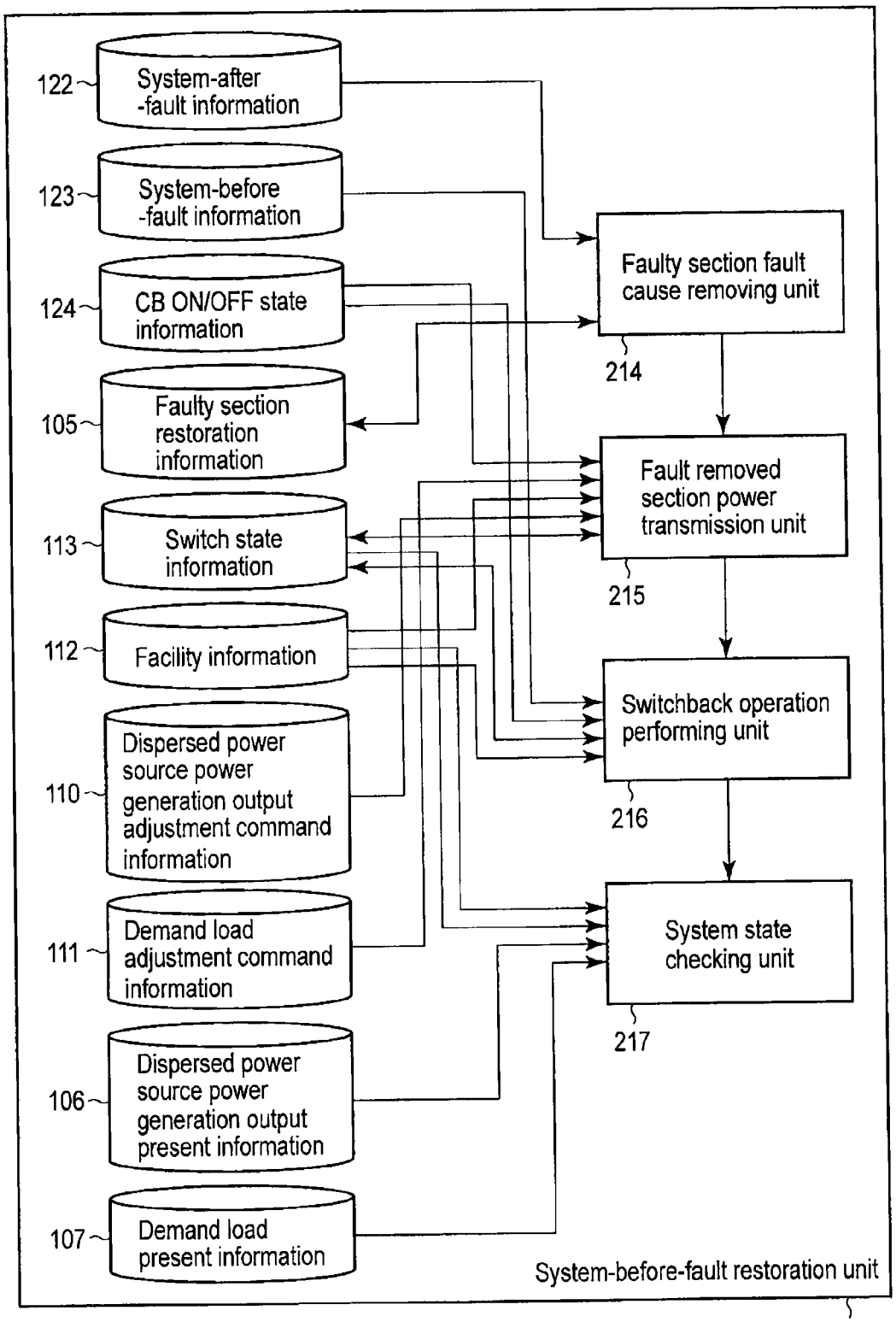
FIG. 7 is a view showing a configuration example of a system-before-fault restoration unit 42.

FIG. 7 is a view showing a configuration example of the system-before-fault restoration unit 42.

The system-before-fault restoration unit 42 includes a faulty section fault cause removing unit 214, fault removed section power transmission unit 215, switchback operation performing unit 216, and system state checking unit 217.

The faulty section fault cause removing unit 214 removes the fault cause of a faulty section by using the faulty section restoration information 105 and system-after-fault information 122 provided by the fault processing unit 36.

The fault removed section power transmission unit 215 transmits electric power to a section from which the fault cause is removed by the faulty section fault cause removing unit 214, by using the CB ON/OFF state information 124 provided by the system monitoring unit 23 or the like, and the switch state information 113, facility information 112, dispersed power source power generation output command information 110, and demand load adjustment command information 111 provided by the abnormal-time interchange procedure formation unit 41.

The switchback operation performing unit 216 forms an operation procedure of returning the system to the power transmission form before the fault and executes a switchback operation by dispersed power source power generation output adjustment and demand facility load adjustment, after electric power is transmitted by the fault removed section power transmission unit 215, by using the system-before-fault information 123, CB ON/OFF state information 124, and facility information 112.

The system state checking unit 217 checks the system state (e.g., overload and the voltage state), after the switchback operation is performed by the switchback operation performing unit 216, by using the switch state information 113 and facility information 112 described previously, and the dispersed power source power generation output present information 106 and the demand load present information 107 provided by the measurement value monitoring unit 32, thereby confirming that there is no problem with the power quality.

Figure 8:
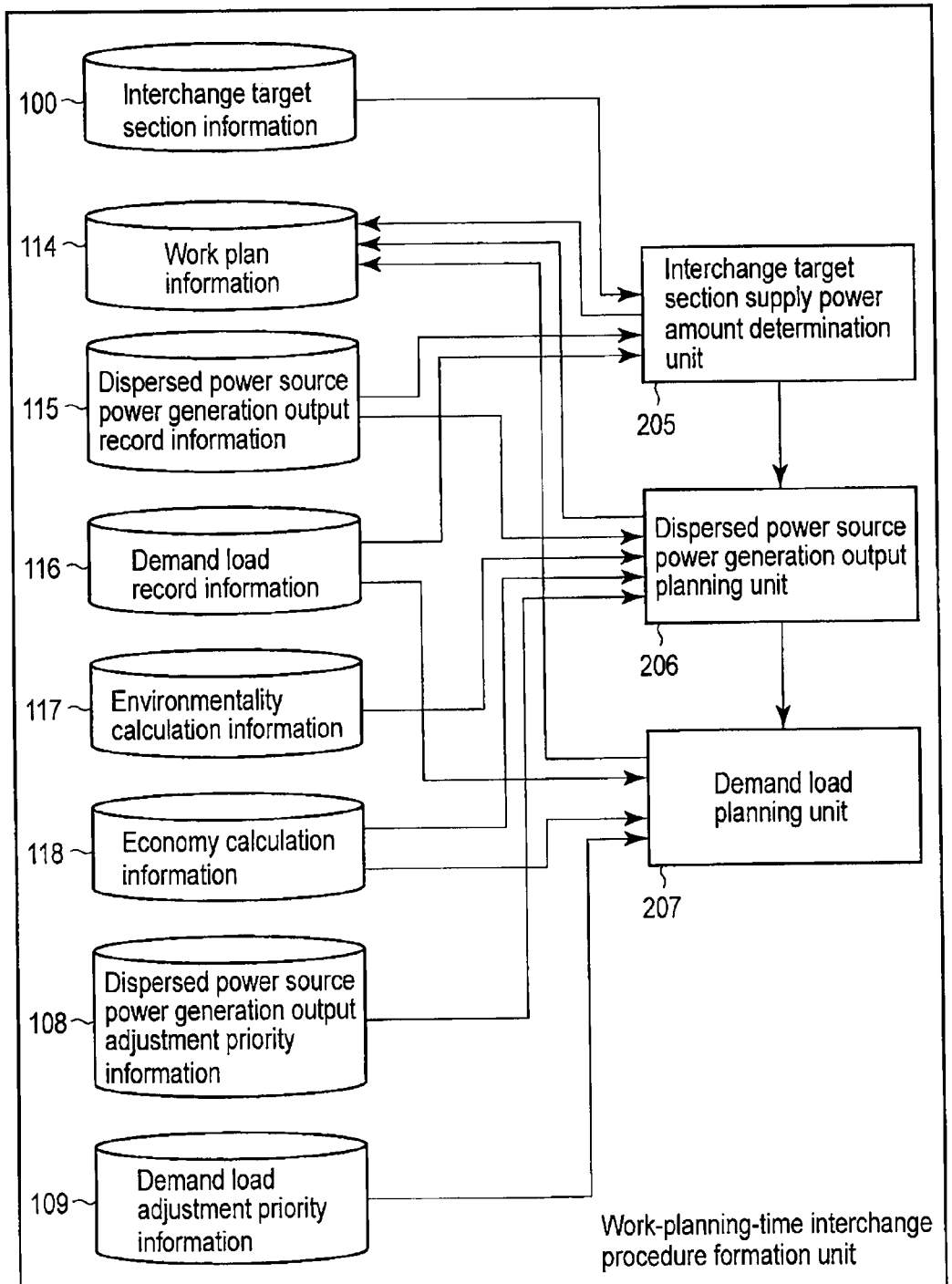
FIG. 8 is a view showing a configuration example of a work-planning-time interchange procedure formation unit 39.

FIG. 8 is a view showing a configuration example of the work-planning-time interchange procedure formation unit 39.

The work-planning-time interchange procedure formation unit 39 includes an interchange target section supply power amount determination unit 205, dispersed power source power generation output planning unit 206, and demand load planning unit 207, as main functions.

The interchange target section supply power amount determination unit 205 forms a part of the work plan information 114 by determining the supply power amount of an interchange target section, by using the interchange target section information 100 provided by the system monitoring unit 23, and the dispersed power source power generation output record information 135 and demand load record information 116 provided by the measurement value monitoring unit 32, and saves the formed information in a storage medium.

The dispersed power source power generation output planning unit 206 forms a part of the work plan information 114 by planning the power generation output amount of each dispersed power source while considering an environmental influence degree corresponding to the power generation output amount of each dispersed power source or a cost corresponding to the power generation output amount of each dispersed power source, by using the information determined by the interchange target section supply power amount determination unit 205, the dispersed power source power generation output record information 115 provided by the measurement value monitoring unit 32, the dispersed power source power generation output adjustment priority information 108 provided by the customer information management unit 33, and the environmentality calculation information 117 and economy calculation information 118, and saves the formed information in a storage medium.

The demand load planning unit 207 forms a part of the work plan information 114 by planning the loading of each demand facility while considering a cost corresponding to the loading of each demand facility, by using the information determined by the dispersed power source power generation output planning unit 206, the demand load record information 116 provided by the measurement value monitoring unit 32, the demand load adjustment priority information 109 provided by the customer information management unit 33, and the economy calculation information 118, and saves the formed information in a storage medium.

Figure 9:
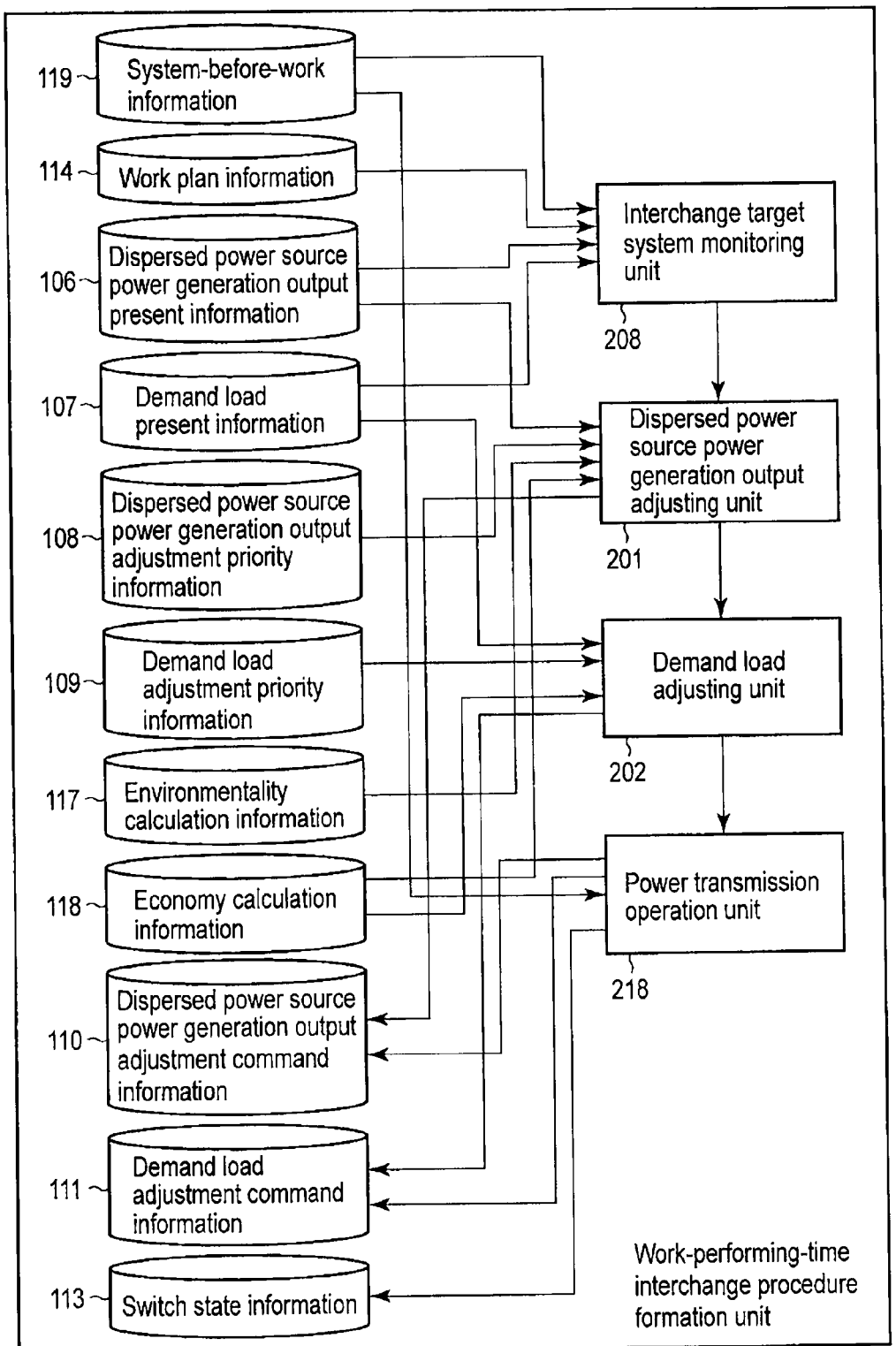
FIG. 9 is a view showing a configuration example of a work-performing-time interchange procedure formation unit 40.

FIG. 9 is a view showing a configuration example of the work-performing-time interchange procedure formation unit 40.

The work-performing-time interchange procedure formation unit 40 includes an interchange target system monitoring unit 208, dispersed power source power generation output adjusting unit 201, demand load adjusting unit 202, and healthy blackout section restoration unit 218, as main functions.

The interchange target system monitoring unit 208 recognizes the difference between a system state when performing a work and a system state assumed as a system state for performing the work, by using the system-before-work information 119 provided by the work planning unit 37 or the like, the work planning information 114 provided by the work-planning-time interchange procedure formation unit 39, and the dispersed power source power generation output present information 106 and demand load present information 107 provided by the measurement value monitoring unit 32.

The dispersed power source power generation output adjusting unit 201 forms the dispersed power source power generation output command information 110 containing an interchange procedure of adjusting the power generation output of a given dispersed power source while considering an environmental influence degree corresponding to the power generation output of each dispersed power source or a cost corresponding to the power generation output of each dispersed power source, by using the information recognized by the interchange target system monitoring unit 208, the dispersed power source power generation output present information 106 provided by the measurement value monitoring unit 32, the dispersed power source power generation output adjustment priority information 108 provided by the customer information management unit 33, and the environmentality calculation information 117 and economy calculation information 118, and stores the formed information in a storage medium.

The demand load adjusting unit 202 forms the demand load adjusting command information 111 containing an interchange procedure of adjusting the loading of a given demand facility while considering a cost corresponding to the loading of each demand facility, if the supply power amount is insufficient by performing only power generation output adjustment by the dispersed power source power generation output adjusting unit 201, by using the demand load present information 107 provided by the measurement value monitoring unit 32, and the demand load adjustment priority information 109 and economy calculation information 118 provided by the customer information management unit 33, and saves the formed information in a storage medium.

The healthy blackout section restoration unit 218 forms an interchange procedure of performing restoration by considering the reverse power flow of a dispersed power source of a demand facility as a target of an interchange process by using the system-before-work information 119 provided by the work planning unit 37 or the like, forms the dispersed power source power generation output command information 110 and demand load adjustment command information 111 reflecting the formed interchange procedure, forms the switch state information 113, and saves the formed procedure and information in a storage medium. The formed dispersed power source power generation output command information 110, demand load adjustment command information 111, and switch state information 113 are provided to the frequency control unit 21, demand/supply control unit 22, or demand load adjusting unit 25 as needed.

Next, the operation of the executive monitoring and control system 1 when a fault has occurred will be explained with reference to FIGS. 10 to 13 while referring to FIGS. 2 and 6 described previously.

Figure 10:
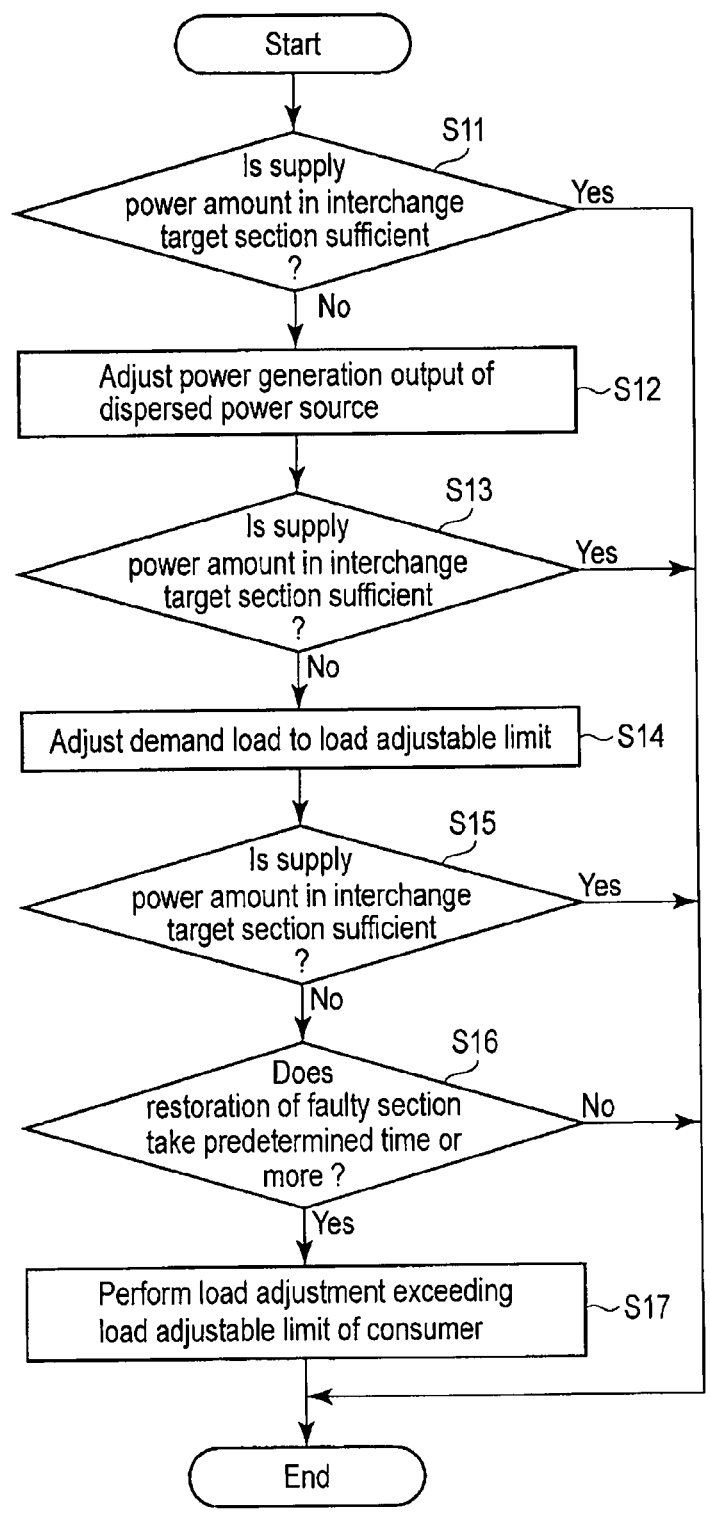
FIG. 10 is a flowchart showing an operation example of the fault-time interchange procedure formation unit 41 when a fault has occurred.
Figure 11:
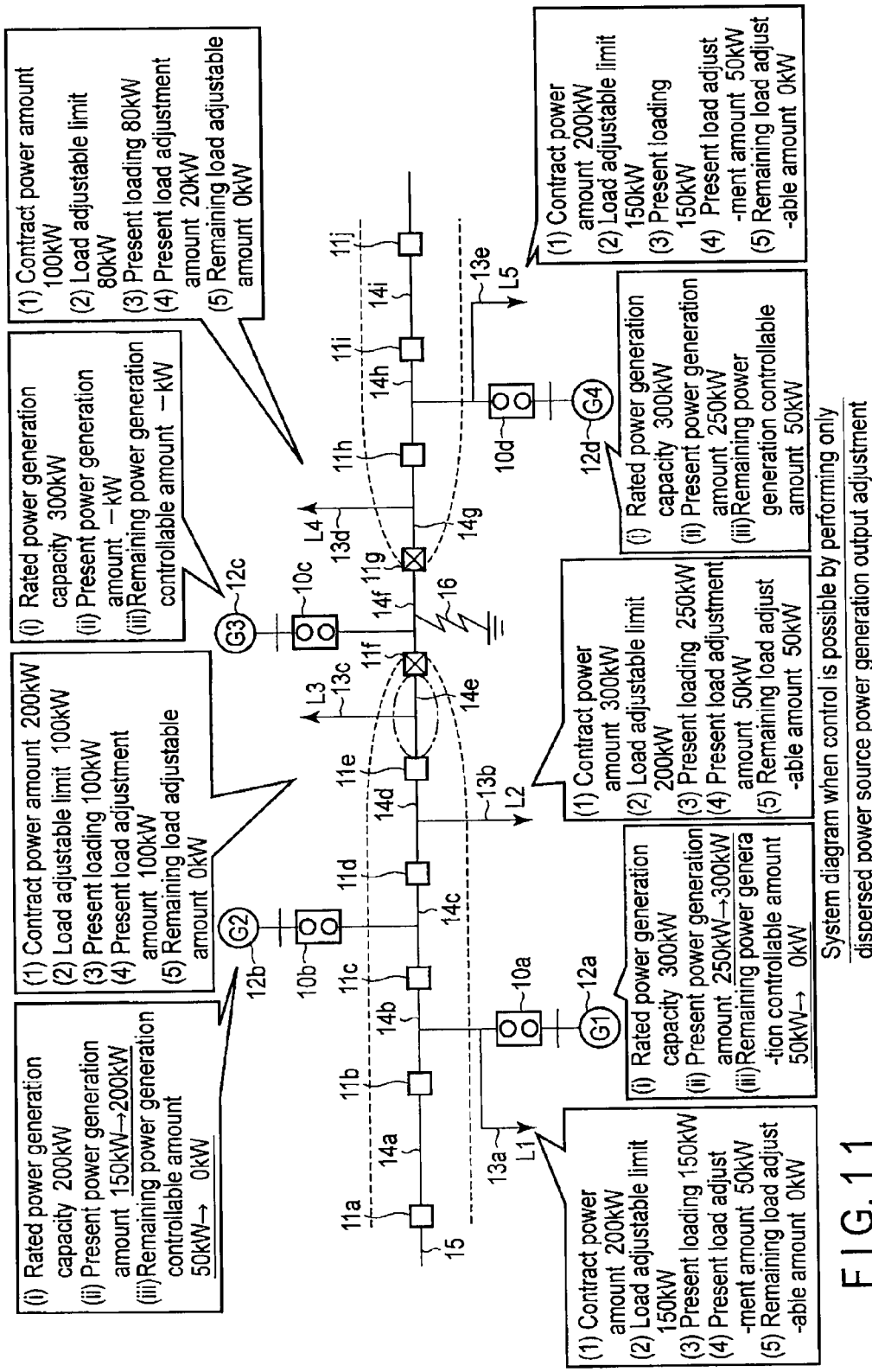
FIG. 11 is a system diagram of a micro grid when control is possible by performing only dispersed power source power generation output adjustment.
Figure 12:
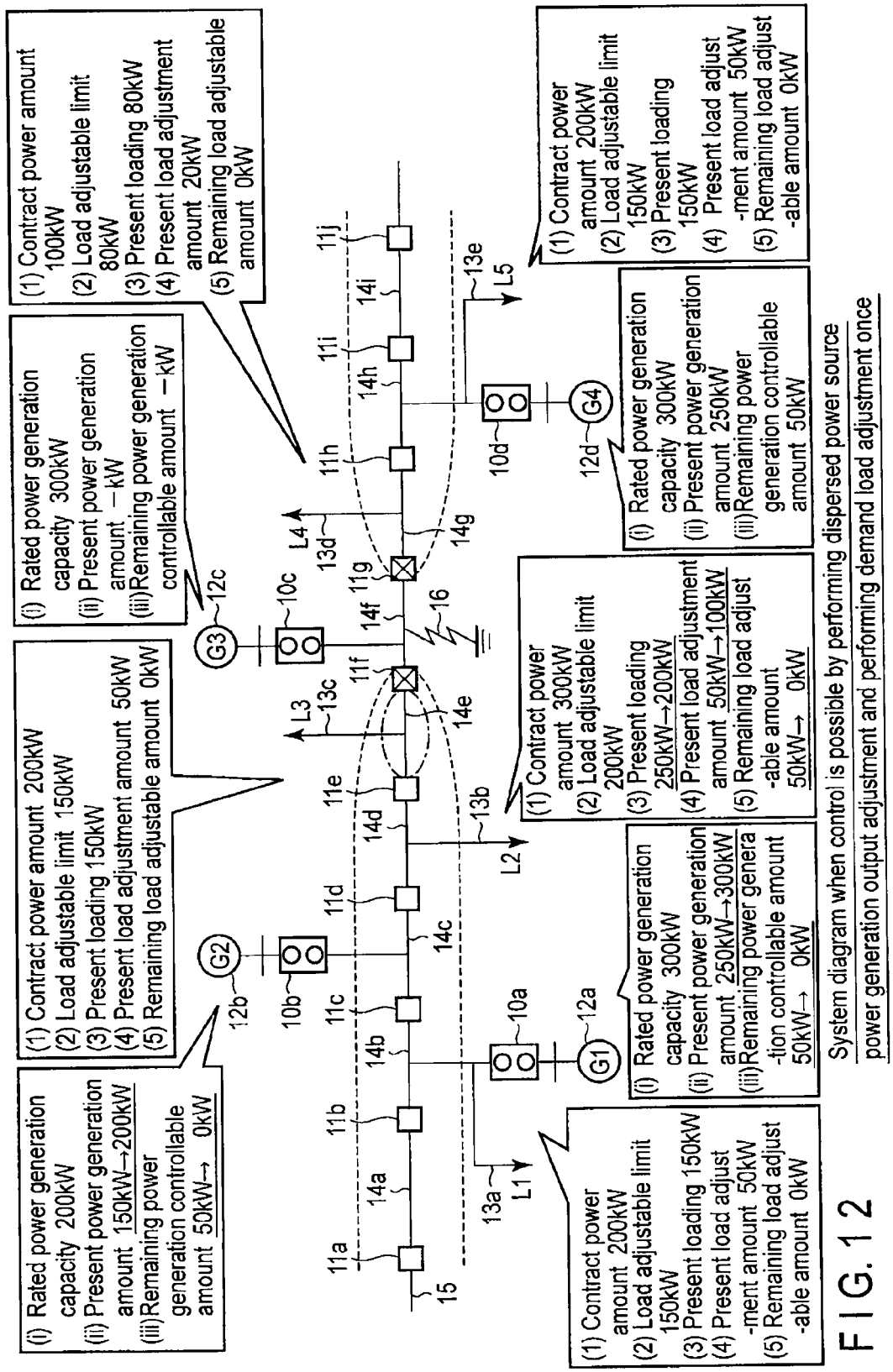
FIG. 12 is a system diagram of a micro grid when control is possible by performing dispersed power source power generation output adjustment and performing demand load adjustment once.
Figure 13:
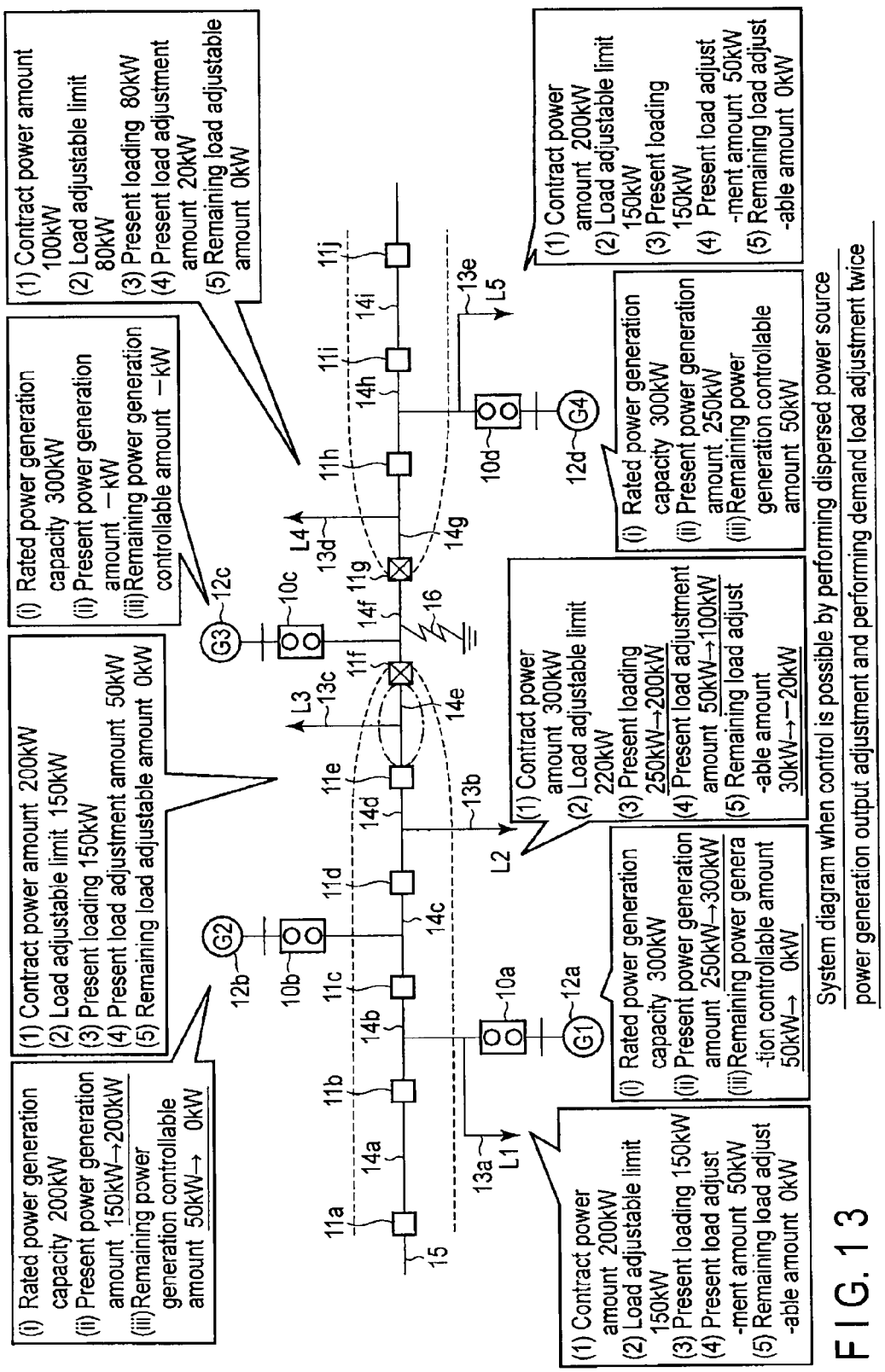
FIG. 13 is a system diagram of a micro grid when control is possible by performing dispersed power source power generation output adjustment and performing demand load adjustment twice.

FIG. 10 is a flowchart showing an operation example of the fault-time interchange procedure formation unit 41 when a fault has occurred. FIG. 11 is a system diagram of a micro grid when control is possible by performing only dispersed power source power generation output adjustment. FIG. 12 is a system diagram of a micro grid when control is possible by performing dispersed power source power generation output adjustment and performing demand load adjustment once. FIG. 13 is a system diagram of a micro grid when control is possible by performing dispersed power source power generation output adjustment and performing demand load adjustment twice. Note that the systems shown in FIGS. 11, 12, and 13 include CBs (Circuit Breakers) 10, switches 11, controllable dispersed power sources 12, demand loads 13, sections 14, distribution lines 15, and a faulty section/work section 16. Also, ranges 14a, 14b, 14c, 14d, 14e, 14g, 14h, and 14i enclosed within the dotted lines represent interchange target sections, and the range 14e enclosed within the one-dot dashed line represents a portion that turns into a supply hindrance section.

When a fault has occurred in, e.g., the section 14f of the micro grid shown in FIG. 11, the executive monitoring and control system 11 shown in FIG. 2 recognizes the occurrence of the fault by the state grasping unit 23, determines the faulty section by the faulty section determination unit 34, and forms the interchange target section information 100 and the faulty section restoration information 105 registering, e.g., the time required for restoration of the faulty section by the fault processing unit 36.

Then, the executive monitoring and control system 1 forms an interchange procedure for restoration from the fault by the abnormal-time interchange procedure formation unit 41 shown in FIG. 6. In the case of an abnormality, the abnormal-time interchange procedure formation unit 41 forms an interchange procedure for restoration from the fault by giving the highest priority to matching the demand and supply of each demand facility and each dispersed power source, i.e., matching the total power generation output amount of the dispersed power sources with the total loading of the demand facilities, disregarding the environmentality and economy because the matter is urgent.

In the abnormal-time interchange procedure formation unit 41 shown in FIG. 6, the system-after-interchange determination unit 200 forms the system-after-interchange information 101 and supply hindrance section information 102 from the interchange target section information 100, and the intra-system connected dispersed power source information 103 containing the rated capacity of each dispersed power source and the demand load present information 107 saved by the customer information saving unit 211. In response to this, the dispersed power source power generation output adjusting unit 201 forms an interchange procedure of adjusting the power generation output amount of a given dispersed power source so that electric power can be transmitted to all demand loads in the system after interchange, based on the dispersed power source power generation output record information 115 formed by the measurement value monitoring unit 32, the intra-system connected dispersed power source information 103, and the dispersed power source power generation output adjustment priority information 108 formed by the customer information management unit 33.

For example, the interchange target sections 14a, 14b, 14c, 14d, and 14e enclosed within the dotted line and the interchange target sections 14g, 14h, and 14i enclosed within the dotted line as shown in FIG. 11 will be explained below. The total demand load of the interchange target sections 14a, 14b, 14c, 14d, and 14e is 500 kW, whereas the power generation output amount of the dispersed power source is 400 kW. Accordingly, the power generation output is lower by 100 kW than the demand load, so the section 14e enclosed within the one-dot dashed line turns into a supply hindrance section (No in step S11 of FIG. 10). To prevent the formation of this supply hindrance section, therefore, the power generation outputs of controllable dispersed power sources 12a and 12b are increased by 50 kW in each (step S12). The priority order when changing the outputs of dispersed power sources is determined based on the dispersed power source power generation output adjustment priority information 108.

If the dispersed power source power generation output adjusting unit 201 determines that power supply to all demand loads is impossible (No in step S13), the demand load adjusting unit 202 forms an interchange procedure of adjusting the loading of a demand facility to the load adjustable limit to which the loading of the demand facility can be adjusted within a determined range in exchange for a financial incentive in accordance with contract with a consumer as a customer, by referring to the system-after-interchange information 101, the contract demand power amount information 104 and demand load adjustment priority information 109 managed by the customer information management unit 33, and the demand load present information 107 formed by the measurement value monitoring unit 32 (step S14).

For example, when the power status is as shown in FIG. 12, the power generation output amount is insufficient even when the power generation outputs of the controllable dispersed power sources 12a and 12b are increased by 50 kW each. Accordingly, the demand loading of a demand load 13b is reduced by 50 kW from a present demand loading of 250 kW to a load adjustable limit of 200 kW, thereby preventing the formation of a supply hindrance section. If load adjustment of a plurality of demand facilities is possible, the load adjustment amount of each load is determined by taking account of the priority based on the demand load adjustment priority information 109 formed by the customer information management unit 33, in accordance with the financial incentive calculation information 121 and contract demand power amount information 104.

If power supply to all sections is impossible even when performing adjustment by the dispersed power source power generation output adjusting unit 201 and demand load adjusting unit 202 (No in step S15), the supply hindrance section restoration unit 203 refers to the faulty section restoration information 105 and supply hindrance section information 102. If it takes a long time to restore the faulty section (Yes in step S16), the demand load adjusting unit 202' forms an interchange procedure of requesting a consumer to perform load adjustment exceeding the load adjustable limit of the consumer in exchange for a financial incentive, by referring to the demand load adjustment priority information 109 and the like (step S17).

For example, when the power status is as shown in FIG. 13, the electric power is insufficient even when the power generation outputs of the controllable dispersed power sources 12a and 12b are increased by 50 kW each, and the demand loading of the demand load 13b is adjusted by 30 kW from a present demand loading of 250 kW to a load adjustable limit of 220 kW. In this case, the formation of a supply hindrance section can be prevented by further adjusting a load of 20 kW by requesting the consumer to perform load adjustment exceeding the load adjustable limit of the consumer in exchange for a financial incentive. The reserved capacity of a dispersed power source is described in, e.g., Jpn. Pat. Appln. KOKAI Publication No. 2007-323942.

The frequency control unit 21, demand/supply control unit 22, and demand load adjusting unit 25 control and adjust dispersed power sources and demand loads, in accordance with the dispersed power source power generation output adjustment command information 110 and demand load adjustment command information 111 formed by the abnormal-time interchange procedure formation unit 41. Demand load adjustment is performed after notifying a consumer of the performance of demand load adjustment by a notification method suitable for the consumer, by referring to the demand load adjustment notifying means information 120 managed by the customer information management unit 33. Note that it is also possible in some cases to perform load adjustment by a remote operation without notifying a consumer of the performance of load adjustment.

Furthermore, the healthy blackout section restoration unit 204 forms an interchange procedure for a healthy blackout section, which contains the dispersed power source power generation output adjustment command information 110, demand load adjustment command information 111, facility information 112, and switch state information 113, and also considers the reverse power flow of a dispersed power source of a demand facility, and notifies the fault processing unit 36 of the result.

As described above, when a fault occurs in the micro grid 10, the abnormal-time interchange procedure formation unit 41 can form an interchange procedure capable of minimizing a supply hindrance by making it possible to adjust the power generation outputs of dispersed power sources and the loads of demand facilities, by referring to, e.g., the information managed by the customer information management unit 33, and the dispersed power source power generation output information and demand load information obtained by the measurement value monitoring unit 32. Also, the system-before-fault restoration unit 42 can perform a switchback operation and check the system state by dispersed power source power generation output adjustment and demand load adjustment, while considering the environmentality and economy of restoration to the system before the fault after the fault is removed.

The operation of the executive monitoring and control system 1 when planning and performing a work will be explained below with reference to FIGS. 2, 8 and 9 again.

When planning a work such as the replacement of a distribution line or the maintenance of a dispersed power source, the executive monitoring and control system 1 shown in FIG. 2 manages the contents of a work plan scheduled in the future by the work planning unit 37, based on the work plan information managed by the facility management unit 30. When performing the work, it is necessary to make a dispersed power source operation plan that takes account of the environmentality and economy in the same manner as in normal operation.

In the work-planning-time interchange procedure formation unit 39 shown in FIG. 8, the interchange target section supply power amount determination unit 205 determines a dispersed power source power generation output amount and demand loading assumed from a scheduled date/time of a work in accordance with the dispersed power source power generation output record information 115 and demand load record information 116, based on the interchange target section information 100, and registers assumed system information when performing the work in the work plan information 114.

Since the power source of a micro grid is an aggregate of small-sized dispersed power sources, no sufficient power amount may be secured owing to system switching for performing a work, although the demand/supply balance is obtained in normal operation. Therefore, if a section to which no sufficient power can be supplied even when making a plan that maximally operates the power generation outputs of dispersed power sources, the dispersed power source power generation output planning unit 206 plans demand load adjustment by the demand load planning unit 207, and forms a work performing system that forms no supply hindrance section.

If it is assumed that electric power is insufficient even when performing demand load adjustment by the demand load planning unit 207, it is possible to place a new dispersed power source in the system, although the method is transient. By considering this additional cost, it is necessary to plan the work performing system again by reconsidering demand load adjustment including, e.g., reconsideration of the financial incentive.

When performing a work, the interchange target system monitoring unit 208 of the work-performing-time interchange procedure formation unit 40 shown in FIG. 9 recognizes the difference from the state assumed when planning the work by grasping the present system information, based on the work plan information 114 managed by the work planning unit 37, and the dispersed power source power generation output present information 106 and demand load present information 107 formed by the measurement value monitoring unit 32.

If there is a difference, the dispersed power source power generation output adjusting unit 201 adjusts the power generation output amount of a given dispersed power source in accordance with the present demand loading, and forms the dispersed power source power generation output adjustment command 110. If the electric power is still insufficient, the demand load adjusting unit 202 adjusts the loading of a demand facility, and forms an optimal interchange procedure as the demand load adjustment command information 111.

The power transmission operating unit 218 switches the systems in order to perform the work, and notifies the work performing unit 38 of the result. The transmission operation unit 218 also notifies the work performing unit 38 of an operation procedure for restoration to the system before work, which considers the reverse power flow of a dispersed power source of a demand facility.

Thus, when planning and performing a work in the micro grid 10, it is possible to form an optimal work system taking account of the environmentality and economy, by referring to the information managed by the customer information management unit 33, and the dispersed power source power generation output information and demand load information obtained by the measurement value monitoring unit 32.

Note that the various functions described in the above-mentioned embodiment can be stored as a computer program in a computer-readable storage medium (e.g., a magnetic disk, optical disk, or semiconductor memory), and read out and executed by a processor as needed. This computer program can also be distributed by transmitting it from a given computer to another computer via a communication medium.

The present invention is not directly limited to the above-mentioned embodiment, and can be embodied by modifying the constituent elements without departing from the spirit and scope of the invention when practiced. It is also possible to form various inventions by properly combining a plurality of constituent elements disclosed in the aforementioned embodiment. For example, some of all the constituent elements disclosed in the embodiment can be omitted. Furthermore, it is also possible to properly combine constituent elements of different embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An executive monitoring and control system configured to monitor and control a power generation output of each dispersed power source and a load of each demand facility in a smart grid or a micro grid, the system comprising a computer including:
   a measurement value storage unit configured to store information indicating a present power generation output amount of each dispersed power source and information indicating a present loading of each demand facility;
   a customer information managing unit configured to manage at least information indicating a rated power generation capacity and power generation output adjustable amount of each dispersed power source, information indicating a contract power amount and load adjustable amount of each demand facility, information which indicates a priority of each dispersed power source and is used to determine a dispersed power source as a target of power generation output amount adjustment, and information which indicates a priority of each demand facility and is used to determine a demand facility as a target of loading adjustment; and
   an abnormal-time interchange procedure forming unit configured to, when a fault occurs in a system of the micro grid or the smart grid, form an interchange procedure of matching total power generation output amounts of dispersed power sources with a total loading of demand facilities, by using at least the information stored by the measurement value storage unit and the information managed by the customer information managing unit,
   wherein the information indicating the power generation output adjustable amount of each dispersed power source is formed using the information stored by the measurement value storage unit,
   the information indicating the priority of each dispersed power source is formed using the information indicating the rated power generation capacity and power generation output adjustable amount of each dispersed power source, and
   the abnormal-time interchange procedure forming unit comprises:
   a system-after-interchange determining unit configured to determine a system after power interchange, and determine a power amount required to restore a healthy blackout section upon power interchange;
   a dispersed power source power generation output adjusting unit configured to form an interchange procedure of adjusting a power generation output amount of a given dispersed power source, by using the information determined system-after-interchange determining unit;
   a demand load adjusting unit configured to form an interchange procedure of adjusting a loading of a given demand facility, if a supply power amount is insufficient when performing only power generation output adjustment by the dispersed power source power generation output adjustment;
   a supply hindrance section restoring unit configured to form an interchange procedure of requesting a consumer to permit further loading adjustment of a demand facility, if the supply power amount is still insufficient even when performing load adjustment by the demand load adjusting unit, and if restoration of a fault takes not less than a predetermined time; and
   a healthy blackout section restoring unit configured to form an interchange procedure of performing restoration considering a reverse power flow of a dispersed power source of a demand facility as a target of an interchange process for the healthy blackout section.

2. The executive monitoring and control system according to claim 1, further comprising a system-before-fault restoring unit configured to restore the system of the micro grid or the smart grid to a state before a fault, by using the information generated by the abnormal-time interchange procedure forming unit.

3. The executive monitoring and control system according to claim 1, wherein the customer information managing unit comprises:
   a customer information saving unit configured to save, in a storage medium, information indicating a financial incentive to be paid to a customer when adjusting a power generation output amount of each dispersed power source or a loading of each demand facility, in addition to information indicating a rated power generation capacity and power generation output adjustable amount of each dispersed power source, and information indicating a contract power amount and load adjustable amount of each demand facility;
   a dispersed power source power generation output adjustment priority information forming unit configured to form information which indicates a priority of each dispersed power source and is used to determine a dispersed power source as a target of power generation output amount adjustment, by using the information saved by the customer information saving unit, and save the formed information in a storage medium; and
   a demand load adjustment priority information forming unit configured to form information which indicates a priority of each demand facility and is used to determine a demand facility as a target of loading adjustment, by using the information saved by the customer information saving unit, and save the formed information in a storage medium.

4. The executive monitoring and control system according to claim 1, said demand load adjusting unit configured to adjust a loading of a demand facility in accordance with the interchange procedure formed by the abnormal-time interchange procedure forming unit.

5. The executive monitoring and control system according to claim 2, wherein the system-before-fault restoring unit comprises:
   a fault removed section power transmitting unit configured to transmit electric power to a section from which a fault cause is removed;
   a switchback operation performing unit configured to form a switchback operation procedure of returning the system to a power transmission state before the fault, and to execute the switchback operation procedure after power transmission is performed by the fault removed section power transmitting unit; and
   a system state checking unit configured to check a system state after the operation procedure is performed by the switchback operation performing unit.

* * * * *